Figure 1:
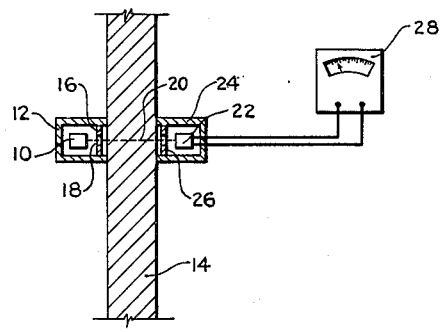

April 11, 1944. D. G. C. HARE 2,346,486

METHOD AND APPARATUS FOR MEASURING THICKNESS

Filed Oct. 7, 1941

D.G.C. HARE
INVENTOR

BY *R. J. Dearborn*
*Daniel Stryker*
HIS ATTORNEY

Patented Apr. 11, 1944

2,346,486

UNITED STATES PATENT OFFICE 2,346,486

METHOD AND APPARATUS FOR MEASURING THICKNESS

Donald G. C. Hare, Houston, Tex., assignor, by mesne assignments, to The Texas Company, New York, N. Y., a corporation of Delaware Application October 7, 1941, Serial No. 413,916

7 Claims. (Cl. 250—83.6)

This invention relates to the measurement of the thickness of plates or sheets and, more particularly, to the measurement of the thickness of the walls of vessels such as are used in petroleum refining processes. The principal object of the invention is to provide a method and an apparatus by means of which an exact measurement can be made of the thickness of a plate or the wall of a vessel where access can be obtained to opposite sides of the walls, and through the use of which it is not necessary to drill and caliper the wall to be measured.

In my copending patent application, Serial No. 342,422, filed June 26, 1940, I have disclosed a method and an apparatus for measuring the thickness of the walls of objects, such as pipes or tubes, from one side thereof. As described in that application, a source of penetrative radiation, such as gamma rays or neutrons, is placed against or near one side of the wall to be measured and some of the radiation entering the wall is scattered within the material forming the wall and returned to a radiation detector located at the same side of the wall as the source of radiation. The detector is connected to a suitable instrument which can be calibrated so as to read directly the thickness of the wall being measured. The amount of radiation scattered within the wall and returned to the detector is a function of the thickness of the wall and thus, a direct and accurate reading can be made.

In the measurement of the thickness of large plates or vessel walls which are too thick to be measured by the "scattered radiation" method disclosed in my aforementioned application, Serial No. 342,422, various systems have been tried but without great success. The determination of the thickness by means of hammering on the wall and noting the pitch of the sound generated thereby is, of course, not accurate and would only be useful in finding holes or deep indentations in the wall caused, for instance, by severe corrosion. It is more common practice to drill holes through the wall and then to insert a calipering device so as to measure the thickness directly. This, of course, is a time consuming operation, since the holes not only have to be drilled but also subsequently plugged as by welding or by means of screw plugs.

In accordance with the present invention a source of penetrative radiation is placed near or against one side of the wall to be measured and a radiation detector is placed against or near the opposite side of the wall. The amount of radiation passing from the source to the detector will be a function of the thickness of the wall, knowing the absorption co-efficient for the radiation used, a meter connected to the detector will provide a reading of the thickness of the wall. It is sometimes difficult to locate a point at the side of the wall exactly opposite the source of radiation and the invention also contemplates a method and an apparatus by means of which an accurate determination can be made without the necessity of positioning the source and the detector exactly opposite each other.

When the source and detector are located on opposite sides of the wall or plate the thickness of which is to be measured, their position with respect to each other may, as pointed out in the preceding paragraph, be to some degree uncertain in one or more of three mutually perpendicular directions. There are, of course, the perpendicular distance from a plane containing the source, and which is parallel to the wall being measured, to a similar plane which contains the detector, and the lateral displacements, both vertical and horizontal, of the detector in this plane from the projection of the source position. In order to measure the thickness of the wall by any absorption means it is obvious that one must accurately fix the relative position of the source and the detector. Since there are three uncertainties in this relative position, it is necessary that three independent values of the transmitted radiation be obtained. With these data it is then possible by various methods, one of which will be described herein, accurately to determine the wall thickness.

Figure 2:
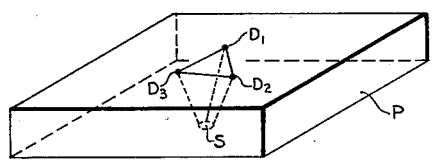
Figure 3:
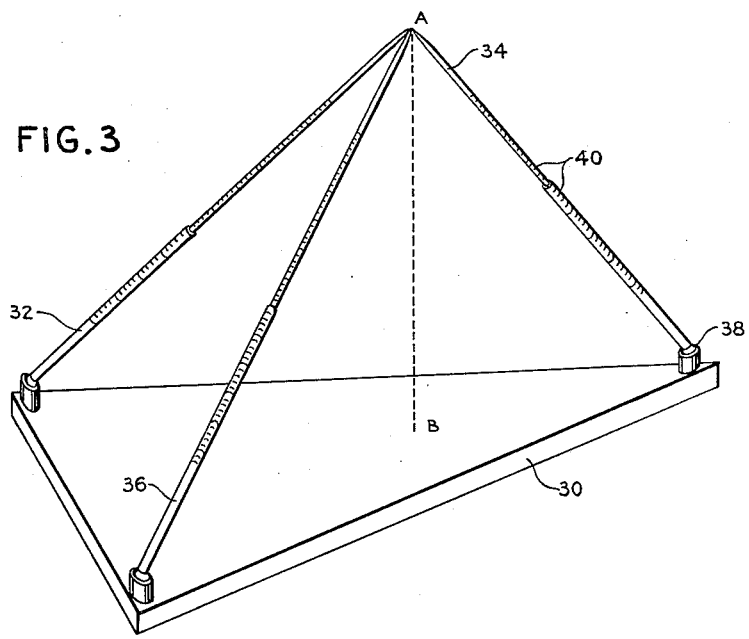

In accordance with the last mentioned method, the source of radiation is placed as before, near or against one side of the vessel wall and a measurement of the transmitted radiation is made at three points substantially opposite the source and at the vertices of a figure such as a triangle. A geometrical figure is then constructed, preferably in the form of a tetrahedron which may have its base the same size and shape as the triangle at the vertices of which the measurements were taken. A longitudinally adjustable arm or rod is pivotally attached to each vortex of this base and each of these arms is then adjusted to a length corresponding with the measurement of transmitted radiation obtained from the corresponding point of the triangle on the vessel wall. After the three arms have thus been adjusted, they are moved so that their free ends will engage at the apex of the tetrahedron. The vertical projection of the apex will then correspond to the amount of transmitted radiation which would have been detected if a detector had been placed at a point exactly opposite the radiation source. For a better understanding of the invention, reference may be had to the accompanying drawing in which Fig. 1 is a sectional elevation of a source of radiation and a detector placed opposite each other at the sides of a plate or wall, the thickness of which is to be measured;

Fig. 2 is a diagrammatic illustration illustrating the use of three detectors placed in a triangle opposite the source of radiation, and Fig. 3 is a perspective view of a device which may be used in connection with the method illustrated in Fig. 2.

Referring to the drawing and particularly to Fig. 1, a source of penetrative radiation such as gamma rays or neutrons 10 is disposed in a housing 12 adapted to be placed near or against one side of a plate 14 which may be the wall of a vessel such as a still used in petroleum refining processes. A collimation system which may comprise a lead plate 16 having an opening 18 is disposed in the housing 12 so as to direct a beam of radiation 20 from the source 10 into the plate 14. A detector 22 of transmitted radiation is disposed within a housing 24 adapted to be placed near or against the other side of the plate 14 at a point opposite the radiation source 10. A collimating plate 26 is disposed so as to confine the pick-up of the detector 22 to the radiation transmitted straight through the plate 14. Electrically connected to the detector 22 is an instrument 28 which may be any suitable type of meter and which may, if desired, be calibrated directly in terms of thickness of the plates to be measured.

In the operation of this form of the invention, the radiation source and the detector are placed as shown in Fig. 1 and the instrument 28 will provide a direct reading of the thickness of the plate 14, providing the coefficient of absorption of the type of radiation used and the material to be measured has previously been ascertained and the instrument 28 properly calibrated. In case the co-efficient of absorption is not known, a reading can be taken on the instrument 28 and this reading then compared with a reading obtained in a similar manner on another plate of known thickness and the same material.

As mentioned hereinbefore, it frequently happens that it is difficult if not impossible to place the detector exactly opposite the source of radiation and, any error in positioning the source and detector other than exactly opposite each other will, of course, result in a reading being obtained which would be interpreted as showing the wall thicker than it actually is. A method will now be described which eliminates this source of error and requires only that the source and detector be placed roughly opposite each other.

In the diagrammatic illustration of Fig. 2 a source of radiation S has been placed at the lower side of a plate P and three detectors, $D_1$, $D_2$ and $D_3$, similar to the detector 22 of Fig. 1, are placed on the opposite side of the plate B. Each of the detectors $D_1$, $D_2$ and $D_3$ may be connected to an instrument such as is shown at 28 in Fig. 1 or, if desired, one detector such as $D_1$ connected to an instrument such as 28 may be used and placed, respectively, at the three points, $D_1$, $D_2$ and $D_3$. The points $D_1$, $D_2$ and $D_3$ are preferably located so that they form the vertices of an equi-lateral triangle, although other configurations could be used. It is obvious that unless the perpendicular projection of the position of the source S into the plane of the triangle $D_1$, $D_2$ and $D_3$ falls exactly at the midpoint of the triangle, the path length through the wall for the rays from the source to the various detectors will be unequal. It has been found that by taking readings with detectors at points $D_1$, $D_2$ and $D_3$, and with the source S in any position on the opposite side of the plate or wall P, sufficient information will be obtained to determine the true position of the source and, hence, the thickness of the plate. In order to do this one needs only to know the absorption coefficient of the wall material for the radiation used. As mentioned in connection with Fig. 1, it has been found much more feasible to calibrate suitably the instrument 28 by means of plates of known composition and thickness and to interpret these results by means of a device such as that shown in Fig. 3.

Fig. 3 illustrates an instrument comprising a base member 30 having the same shape as the triangle formed by the points $D_1$, $D_2$ and $D_3$ shown in Fig. 2, and three rods or arms 32, 34 and 36 whose lengths are independently adjustable. Each rod is pivotally mounted at one corner of the base 30 as by means of ball and socket joints 38 and each rod is preferably formed of two or more telescoping portions with indicia 40 to indicate the length of the arm.

In operation let us assume that the rod 32 is attached to that corner of the base 30 corresponding to the point $D_1$ in Fig. 2 and that rods 34 and 36 are attached to the base at the other two vertices corresponding to points $D_2$ and $D_3$, respectively. The source S of radiation and the three detectors $D_1$, $D_2$ and $D_3$ are placed approximately opposite each other on the plate or wall P and the three readings obtained. The rod 32 is then adjusted so that its length is made proportional to some function of the intensity reading of detector $D_1$, the length of rod 34 proportional to the reading of detector $D_2$ and the length of rod 36 proportional to the reading of the detector $D_3$. It is convenient to make the length of these rods inversely proportional to the logarithm of the intensity readings, although many other functions may be used. We will then have, in general, three rods whose lengths are unequal, and it will be found that upon moving these rods about in their ball and socket joints that there is one and only one position for each rod so that the upper ends of all three rods will meet at the apex A. The vertical projection of the point A to the plane of the triangular base 30 will then indicate the true thickness of that portion of the wall covered by the triangle at whose vertices the detectors were placed. This vertical projection is shown at AB in Fig. 3.

It is believed apparent that instead of a single source and three detectors, a single detector and three sources can also be used, and a single detector at one side of the plate and a single source which is placed on the other side of the plate successively at the vertices of the triangular base 30 held in position against the wall, is preferable.

Obviously many modifications and variations of the invention, as hereinbefore set forth, may be made without departing from the spirit and scope thereof and, therefore, only such limitations should be imposed as are indicated in the appended claims.

I claim:

1. The method of measuring the thickness of a plate which comprises directing a beam of penetrative radiation into said plate from a source at one side thereof, detecting at three points at the other side of said plate approximately opposite said source the amounts of radiation transmitted through the plate from the source to said points, said points being disposed at the vertices of a triangle, constructing a geometrical figure having a similar triangle as its base and each of its upwardly projecting edges of a length corresponding to some function of the transmitted radiation detected at the corresponding point or vertex of the triangle on said plate, and determining the vertical projection of the common vertex of said edges on said base, said projection being indicative of the amount of transmitted radiation which would have been detected at a point exactly opposite said source.

2. The method of measuring the thickness of the wall of a vessel which comprises directing a beam of penetrative radiation into said wall from a source placed at one side thereof, detecting at three points at the other side of said wall substantially opposite said source the amounts of radiation transmitted through the wall obliquely from the source to each of said points, said points being disposed at the vertices of a triangle, constructing a tetrahedron having said triangle as its base and each of its upwardly projecting edges of a length corresponding to a function of the transmitted radiation detected at the corresponding point on said wall, and determining the perpendicular distance from the common vertex of said edges to said triangular base, said distance being indicative of the amount of transmitted radiation which would have been detected at a point exactly opposite said source.

3. The method of measuring the thickness of the wall of a vessel which comprises directing gamma ray radiation into said wall from a source at one side thereof, measuring at a plurality of points at the other side of said wall spaced in a geometrical figure approximately opposite said source the amounts of radiation transmitted obliquely through the wall from the source to each of said points, constructing a figure having said geometrical figure as its base and each of its upwardly projecting edges of a length corresponding to a function of the transmitted radiation detected at the corresponding point on the geometrical figure on the wall, said edges meeting in a common vertex, and determining the distance from the common vertex of said edges perpendicular to said base, said distance corresponding to the amount of transmitted radiation which would have been detected by a detector placed on said wall at a point exactly opposite said source of radiation.

4. The method of measuring the thickness of an opaque body which comprises placing a source of penetrative radiation at a point on one side of said body, measuring at not less than three points on the other side of the body the amounts of radiation transmitted through the body from said source to said three points, and determining mathematically from these measurements the amount of radiation which would be detected if a detector were placed on the side of the body exactly opposite said source.

5. The method of measuring the thickness of a plate which comprises directing a beam of penetrative radiation into said plate from a source at one side thereof, detecting at three points at the other side of said plate approximately opposite said source the amounts of radiation transmitted through the plate from the source to said points, said points being disposed at the vertices of a triangle, determining mathematically from these data the amount of radiation which would be detected if a detector were placed on the side of the plate exactly opposite said source and from this information and the coefficient of absorption of the radiation in said plate determining the thickness of the plate opposite said source.

6. The method of obtaining, through a visually opaque body, radiation intensity measurements which are transferrable into units of thickness of said body, comprising supplying on one side of said body a source of radiation capable of penetrating said body, measuring transmitted radiation on the other side of said body at not less than three points disposed in a plane surface, said surface being disposed perpendicularly with respect to the direction of thickness measurement through said body, and determining mathematically from these measurements and the coefficient of absorption of the radiation in said body the thickness of the body opposite said source.

7. In the method of measuring the thickness of an opaque plate at a predetermined point by determining the amount of radiation capable of being transmitted perpendicularly through the plate at said point and in which method it is not practicable to place a radiation detector on the other side of said plate exactly opposite said point, the steps of placing a source of penetrative radiation at said point on one side of said plate, measuring at a plurality of separated points on the other side of said plate the radiation transmitted through the plate from said source to said points, determining mathematically from these measurements the amount of radiation which would be detected if a detector were placed on the side of the plate exactly opposite said source, and from this information and the coefficient of absorption of the radiation in said plate determining the thickness of the plate opposite said source.

DONALD G. C. HARE.